US010648318B2

(12) United States Patent
Song et al.

(10) Patent No.: US 10,648,318 B2
(45) Date of Patent: May 12, 2020

(54) FEEDBACK BASED TOOLFACE CONTROL SYSTEM FOR A ROTARY STEERABLE DRILLING TOOL

(71) Applicant: Halliburton Energy Services, Inc., Houston, TX (US)

(72) Inventors: Xingyong Song, Houston, TX (US); Jason D. Dykstra, Spring, TX (US); Venkata Madhukanth Vadali, Houston, TX (US); Yuzhen Xue, Humble, TX (US); Xiaoqing Ge, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/517,203

(22) PCT Filed: Nov. 10, 2014

(86) PCT No.: PCT/US2014/064839
§ 371 (c)(1),
(2) Date: Apr. 6, 2017

(87) PCT Pub. No.: WO2016/076828
PCT Pub. Date: May 19, 2016

(65) Prior Publication Data
US 2017/0306740 A1 Oct. 26, 2017

(51) Int. Cl.
*E21B 44/00* (2006.01)
*G05B 13/04* (2006.01)
(Continued)

(52) U.S. Cl.
CPC ............... *E21B 44/00* (2013.01); *E21B 4/02* (2013.01); *E21B 7/04* (2013.01); *E21B 7/068* (2013.01);
(Continued)

(58) Field of Classification Search
CPC .......... E21B 4/02; E21B 44/00; E21B 47/022; E21B 7/04
(Continued)

(56) References Cited

U.S. PATENT DOCUMENTS

| 5,465,799 A | 11/1995 | Ho |
| 6,050,348 A | 4/2000 | Richardson et al. |

(Continued)

FOREIGN PATENT DOCUMENTS

| CA | 2960995 | 5/2016 |
| CA | 2963378 | 5/2016 |

(Continued)

OTHER PUBLICATIONS

International Search Report and Written Opinion, Application No. PCT/US2014/064850; 16 pgs, dated Jul. 22, 2015.
(Continued)

*Primary Examiner* — John C Kuan
(74) *Attorney, Agent, or Firm* — Baker Botts L.L.P.

(57) ABSTRACT

In accordance with some embodiments of the present disclosure, systems and methods for a feedback based toolface control system for a rotary steerable drilling tool is disclosed. The method includes determining a desired toolface of a drilling tool, calculating a toolface error, calculating a correction to correct the toolface error by: estimating, using a model, an output of each of a plurality of states of the model based on an input to each of the states of the model and determining a desired input to each of the plurality of states, beginning at the toolface, based on a desired output of at least one of the plurality of states connected to a particular state, transmitting the signal to the input component of the drilling tool such that the signal adjusts the current toolface based on the correction, and drilling a wellbore with a drill bit oriented at the desired toolface.

20 Claims, 8 Drawing Sheets

(51) Int. Cl.
*E21B 47/024* (2006.01)
*E21B 7/04* (2006.01)
*E21B 4/02* (2006.01)
*E21B 7/06* (2006.01)
*E21B 34/06* (2006.01)

(52) U.S. Cl.
CPC ............ *E21B 34/06* (2013.01); *E21B 47/024* (2013.01); *G05B 13/041* (2013.01)

(58) Field of Classification Search
USPC ................................ 702/9, 13, 14, 182–185
See application file for complete search history.

(56) References Cited

U.S. PATENT DOCUMENTS

| | | |
|---|---|---|
| 6,438,495 B1 | 8/2002 | Chau |
| 6,585,061 B2 | 7/2003 | Radzinski |
| 7,054,750 B2 | 5/2006 | Rodney et al. |
| 7,975,392 B1 | 7/2011 | Spaulding |
| 8,393,413 B2 | 3/2013 | Weston et al. |
| 8,672,055 B2 | 3/2014 | Boone |
| 8,672,056 B2 | 3/2014 | Clark et al. |
| 8,676,558 B2 | 3/2014 | Pirovolou |
| 9,085,938 B2 | 7/2015 | Panchal |
| 2003/0037963 A1 | 2/2003 | Barr |
| 2004/0222019 A1 | 11/2004 | Estes |
| 2008/0314641 A1 | 12/2008 | McClard |
| 2009/0000823 A1 | 1/2009 | Pirovolou |
| 2009/0090555 A1 | 4/2009 | Boone |
| 2009/0316528 A1* | 12/2009 | Ramshaw ............... E21B 44/00 367/83 |
| 2010/0217530 A1 | 8/2010 | Boone |
| 2011/0024187 A1 | 2/2011 | Boone et al. |
| 2011/0024191 A1 | 2/2011 | Boone |
| 2011/0147083 A1 | 6/2011 | Mauldin et al. |
| 2012/0024606 A1 | 2/2012 | Pirovolou et al. |
| 2012/0105076 A1 | 5/2012 | Li et al. |
| 2013/0032401 A1 | 2/2013 | Edbury et al. |
| 2013/0126241 A1 | 5/2013 | Boone et al. |
| 2014/0060035 A1 | 3/2014 | Winslow et al. |
| 2014/0110176 A1 | 4/2014 | Benson |
| 2014/0151121 A1 | 6/2014 | Boone et al. |
| 2014/0158428 A1 | 6/2014 | Boone et al. |
| 2014/0163888 A1 | 6/2014 | Bowler |
| 2014/0190750 A1 | 7/2014 | Samuel |
| 2015/0107903 A1 | 4/2015 | Sugiura |
| 2015/0218887 A1 | 8/2015 | Bayliss |
| 2015/0377004 A1 | 12/2015 | Hornblower |
| 2016/0160628 A1 | 6/2016 | Sugiura |
| 2016/0245067 A1 | 8/2016 | Haci et al. |
| 2017/0306702 A1 | 10/2017 | Summers |
| 2018/0298743 A1 | 10/2018 | Sullivan |

FOREIGN PATENT DOCUMENTS

| | | |
|---|---|---|
| CA | 2963629 | 5/2016 |
| WO | 2009/039448 | 3/2009 |
| WO | 2014-160567 | 10/2014 |

OTHER PUBLICATIONS

International Search Report and Written Opinion, Application No. PCT/US2014/064834; 14 pgs, dated Jul. 17, 2015.
International Search Report and Written Opinion, Application No. PCT/US2014/064836; 13 pgs, dated Aug. 7, 2015.
International Search Report and Written Opinion, Application No. PCT/US2014/064839; 13 pgs, dated Jul. 22, 2015.
International Preliminary Report on Patentability for PCT Patent Application No. PCT/US2014/064839, dated May 26, 2017; 9 pages.
Office Action for Canadian Patent Application No. 2963380, dated Jan. 25, 2018; 4 pages.
International Preliminary Report on Patentability for PCT Patent Application No. PCT/US2014/064850, dated May 26, 2017; 12 pages.
Extended European Search Report for European Patent Application No. 14905797.8, dated Aug. 24, 2017; 7 pages.
Office Action for Canadian Patent Application No. 2963629, dated Jan. 25, 2018; 4 pages.
International Preliminary Report on Patentability for PCT Patent Application No. PCT/US2014/064834, dated May 26, 2017; 9 pages.
Office Action for Canadian Patent Application No. 2963378, dated Jan. 25, 2018; 4 pages.
International Preliminary Report on Patentability for PCT Patent Application No. PCT/US2014/064836, dated May 26, 2017; 9 pages.
Office Action for Canadian Patent Application No. 2960995, dated Jan. 25, 2018; 4 pages.
Office Action for Canadian Patent Application No. 2963378, dated Mar. 11, 2019; 4 pages, dated Mar. 11, 2019.
Office Action for Canadian Patent Application No. 2963378, dated Mar. 6, 2020.

* cited by examiner

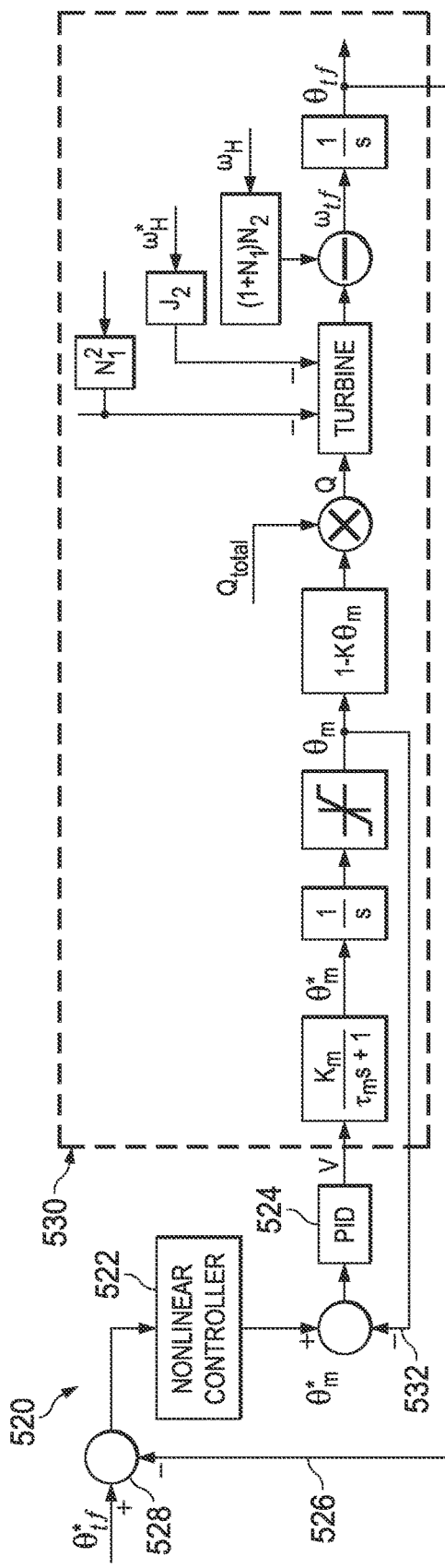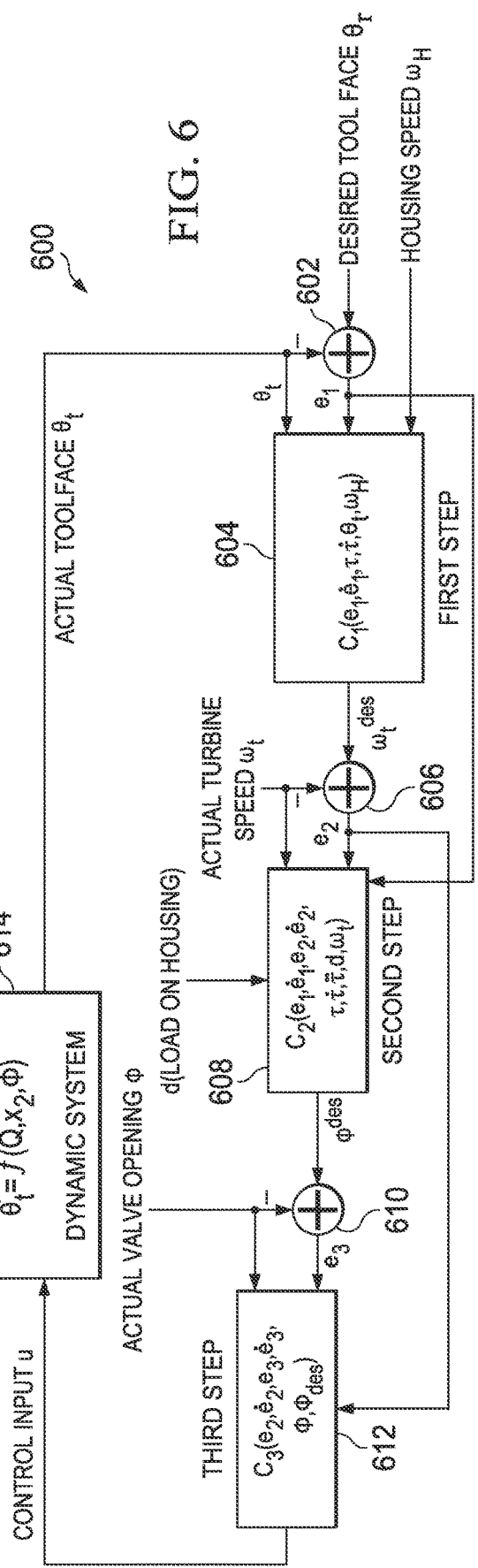
FIG. 5B
FIG. 6

FEEDBACK BASED TOOLFACE CONTROL SYSTEM FOR A ROTARY STEERABLE DRILLING TOOL

RELATED APPLICATIONS

This application is a U.S. National Stage Application of International Application No. PCT/US2014/064839 filed Nov. 10, 2014, which designates the United States, and which is incorporated herein by reference in its entirety.

TECHNICAL FIELD

The present disclosure relates generally to downhole drilling tools and, more particularly, to a feedback based toolface control system for rotary steerable drilling tools.

BACKGROUND

Various types of downhole drilling tools including, but not limited to, rotary drill bits, reamers, core bits, and other downhole tools have been used to form wellbores in associated downhole formations. Examples of such rotary drill bits include, but are not limited to, fixed cutter drill bits, drag bits, polycrystalline diamond compact (PDC) drill bits, matrix drill bits, roller cone drill bits, rotary cone drill bits and rock bits associated with forming oil and gas wells extending through one or more downhole formations.

Conventional wellbore drilling in a controlled direction requires multiple mechanisms to steer drilling direction. Bottom hole assemblies have been used and have included the drill bit, stabilizers, drill collars, heavy weight pipe, and a positive displacement motor (mud motor) having a bent housing. The bottom hole assembly is connected to a drill string or drill pipe extending to the surface. The assembly steers by sliding (not rotating) the assembly with the bend in the bent housing in a specific direction to cause a change in the wellbore direction. The assembly and drill string are rotated to drill straight.

Other conventional wellbore drilling systems use rotary steerable arrangements that use deflection to point-the-bit. They may provide a bottom hole assembly that may have a flexible shaft in the middle of the tool with an internal cam to bias the tool to point-the-bit.

BRIEF DESCRIPTION OF THE DRAWINGS

For a more complete understanding of the present disclosure and its features and advantages, reference is now made to the following description, taken in conjunction with the accompanying drawings, in which:

FIGS. 5A and 5B illustrate block diagrams of aspects of a control system for a rotary steerable drilling system that linearize a nonlinear response of the drilling system;

FIG. 6 illustrates a block diagram of a control system including a backstepping based controller to control a toolface;

DETAILED DESCRIPTION

A rotary steerable drilling system may be used with directional drilling systems including steering a drill bit to drill a non-vertical wellbore. Directional drilling systems, such as a rotary steerable drilling system, may include systems and/or components to measure, monitor, and/or control the toolface of the drill bit. The term "toolface" may refer to the orientation of a reference direction on the drill string as compared to a fixed reference, The "toolface angle" refers to the angle, measured in a plane perpendicular to the drill string axis, between the reference direction and the fixed reference, and is usually defined between +180 degrees and −180 degrees. For example, in a near-vertical wellbore, north may be the fixed reference. The toolface angle may be the amount the drill string has rotated away from north and may also be referred to as the magnetic toolface. For a more-deviated wellbore, the top of the borehole may be the fixed reference. In such cases, the toolface angle may be referred to as the gravity toolface, or high side toolface.

During drilling operations, disturbances that may cause tool rotation anomalies such as interaction with cuttings, vibrations, bit walk, bit whirl, and bit bounce may also cause the toolface to deviate from a desired angle. When the toolface is not held constant, the wellbore may not be smooth and the time and cost to drill the wellbore may increase due to time spent drilling in a direction that deviates from the desired direction and a slower drilling speed. Therefore, it may be advantageous to implement a control system as part of a rotary steerable drilling system that controls the toolface. Accordingly, control systems and methods may be designed in accordance with the teachings of the present disclosure and may have different designs, configurations, and/or parameters according to the particular application. Embodiments of the present disclosure and its advantages are best understood by referring to FIGS. 1 through 8, where like numbers are used to indicate like and corresponding parts.

Figure 1A:
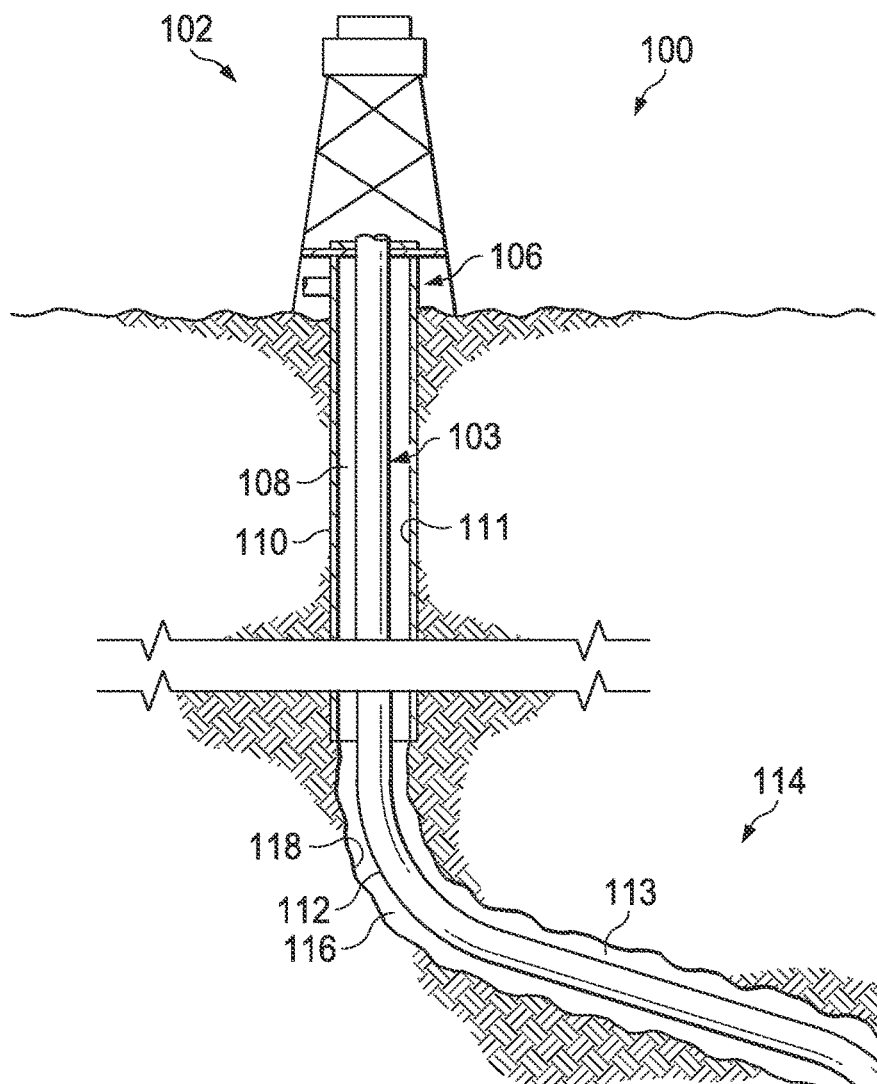
FIG. 1A illustrates an elevation view of an example embodiment of a drilling system.

FIG. 1A illustrates an elevation view of an example embodiment of a drilling system. Drilling system 100 may include well surface or well site 106. Various types of drilling equipment such as a rotary table, drilling fluid pumps and drilling fluid tanks (not expressly shown) may be located at well site 106. For example, well site 106 may include drilling rig 102 that has various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

Drilling system 100 may also include drill string 103 associated with drill bit 101 that may be used to form a wide variety of wellbores or bore holes such as generally diagonal or directional wellbore 114. The term "directional drilling" may be used to describe drilling a wellbore or portions of a wellbore that extend at a desired angle or angles relative to vertical. The desired angles may be greater than normal variations associated with vertical wellbores. Directional drilling may be used to access multiple target reservoirs within a single wellbore 114 or reach a reservoir that may be inaccessible via a vertical wellbore. Rotary steerable drilling system 123 may be used to perform directional drilling. Rotary steerable drilling system 123 may use a point-the-bit method to cause the direction of drill bit 101 to vary relative to the housing of rotary steerable drilling system 123 by bending a shaft (e.g., inner shaft 208 shown in FIG. 2) running through rotary steerable drilling system 123.

Bottom hole assembly (BHA) 120 may include a wide variety of components configured to form wellbore 114. For example, components 122a and 122b of BHA 120 may include, but are not limited to, drill bits (e.g., drill bit 101), coring bits, drill collars, rotary steering tools (e.g., rotary steerable drilling system 123), directional drilling tools, downhole drilling motors, reamers, hole enlargers or stabilizers. The number and types of components 122 included in BHA 120 may depend on anticipated downhole drilling conditions and the type of wellbore that will be formed by drill string 103 and rotary drill bit 101. BHA 120 may also include various types of well logging tools (not expressly shown) and other downhole tools associated with directional drilling of a wellbore. Examples of logging tools and/or directional drilling tools may include, but are not limited to, acoustic, neutron, gamma ray, density, photoelectric, nuclear magnetic resonance, rotary steering tools and/or any other commercially available well tool. Further, BHA 120 may also include a rotary drive (not expressly shown) connected to components 122a and 122b and which rotates at least part of drill string 103 together with components 122a and 122b.

Wellbore 114 may be defined in part by casing string 110 that may extend from well surface 106 to a selected downhole location. Portions of wellbore 114, as shown in FIG. 1A, that do not include casing string 110 may be described as "open hole." Various types of drilling fluid may be pumped from well surface 106 downhole through drill string 103 to attached drill bit 101. "Uphole" may be used to refer to a portion of wellbore 114 that is closer to well surface 106 and "downhole" may be used to refer to a portion of wellbore 114 that is further from well surface 106 along the length of wellbore 114. In a directional wellbore, a downhole portion of wellbore 114 may not be deeper than an uphole portion of wellbore 114 The drilling fluids may be directed to flow from drill string 103 to respective nozzles passing through rotary drill bit 101. The drilling fluid may be circulated uphole to well surface 106 through annulus 108. In open hole embodiments, annulus 108 may be defined in part by outside diameter 112 of drill string 103 and inside diameter 118 of wellbore 114. In embodiments using casing string 110, annulus 108 may be defined by outside diameter 112 of drill string 103 and inside diameter 111 of casing string 110.

Drilling system 100 may also include rotary drill bit ("drill bit") 101. Drill bit 101 may include one or more blades 126 that may be disposed outwardly from exterior portions of rotary bit body 124 of drill bit 101. Blades 126 may be any suitable type of projections extending outwardly from rotary bit body 124. Drill bit 101 may rotate with respect to bit rotational axis 104 in a direction defined by directional arrow 105. Blades 126 may include one or more cutting elements 128 disposed outwardly from exterior portions of each blade 126. Blades 126 may also include one or more depth of cut controllers (not expressly shown) configured to control the depth of cut of cutting elements 128. Blades 126 may further include one or more gage pads (not expressly shown) disposed on blades 126. Drill bit 101 may be designed and formed in accordance with teachings of the present disclosure and may have many different designs, configurations, and/or dimensions according to the particular application of drill bit 101.

Figure 1B:
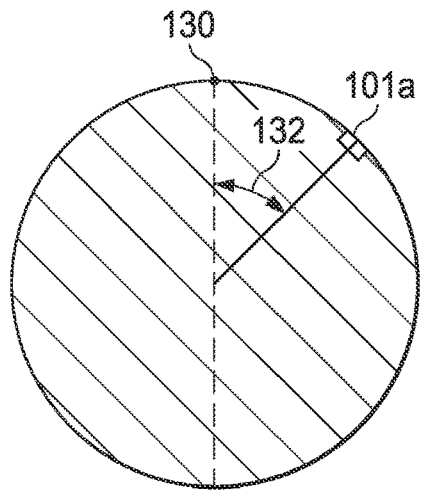
FIG. 1B illustrates a toolface angle for an example embodiment of a drilling system.
Figure 2:
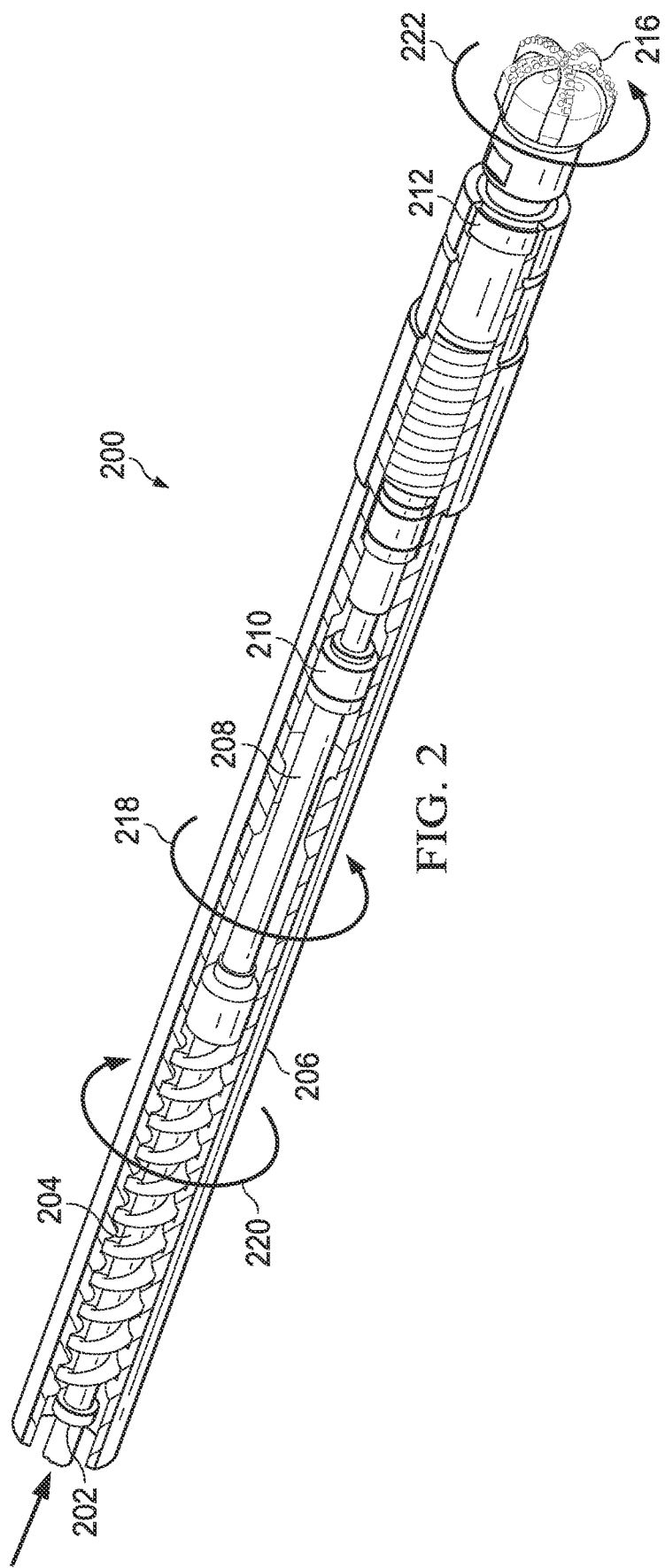
FIG. 2 illustrates a perspective view of a rotary steerable drilling system.

Drill bit 101 may be a component of rotary steerable drilling system 123, discussed in further detail in FIG. 2. Drill bit 101 may be steered, by adjusting the toolface of drill bit 101, to control the direction of drill bit 101 to form generally directional wellbore 114. The toolface may be the angle, measured in a plane perpendicular to the drill string axis, that is between a reference direction on the drill string and a fixed reference and may be any angle between +180 degrees and −180 degrees. For example, in FIG. 1A, the plane perpendicular to the drill string axis may be plane A-A. For a directional wellbore, the fixed reference may be the top of the wellbore, shown in FIG. 1B as point 130. The toolface may be the angle between the fixed reference and the reference direction, e.g., the tip of drill bit 101. In FIG. 1B, toolface angle 132 is the angle between point 130, e.g., the top of the wellbore, and the tip of drill bit 101a. In other embodiments, the fixed reference may be magnetic north, a line opposite to the direction of gravity, or any other suitable fixed reference point.

While performing a drilling operation, disturbances (e.g., vibrations, bit walk, bit bounce, the presence of formation cuttings, or any other cause of a tool rotation anomaly) may cause the toolface to deviate from the desired toolface input by a drilling operator, control system, or a computer. Therefore it may be advantageous to control the toolface by incorporating a control system that compensates for disturbances acting on drill bit 101 and the dynamics of rotary steerable drilling system 123 in order to maintain the desired toolface, as discussed in further detail below. The control system may be located downhole, as a component of rotary steerable drilling system 123, or may be located at well surface 106 and may communicate control signals to rotary steerable drilling system 123 via drill string 103, through the drilling fluids flowing through drill string 103, or any other suitable method for communicating to and from downhole tools. Rotary steerable drilling system 123 including a control system designed according to the present disclosure may improve the accuracy of steering drill bit 101 by accounting for and mitigating the effect of downhole vibrations on the toolface. A toolface that is closer to the planned toolface may also improve the quality of wellbore 114 by preventing drill bit 101 from deviating from the planned toolface throughout the drilling process. Additionally, rotary steerable drilling system 123 including a control system designed according to the present disclosure may improve tool life of drill bit 101 and improve drilling efficiency due to the ability to increase the speed of drilling and decrease the cost per foot of drilling.

FIG. 2 illustrates a perspective view of a rotary steerable drilling system. Rotary steerable drilling system 200 may include shear valve 202, turbine 204, housing 206, inner shaft 208, eccentric cam 210, thrust bearings 212, and drill bit 216. Housing 206 may rotate with a drill string, such as drill string 103 shown in FIG. 1A. For example, housing 206 may rotate in direction 218. To maintain a desired toolface while housing 206 rotates, inner shaft 208 may rotate in the opposite direction of, and at the same speed as, the rotation of housing 206. For example, inner shaft 208 may rotate in direction 220 at the same speed as housing 206 rotates in direction 218.

Shear valve 202 may be located uphole of the other components of rotary steerable drilling system 200. Shear valve 202 may be designed to govern the flow rate of drilling fluid into turbine 204. For example, shear valve 202 may be opened by a fractional amount such that the flow rate of drilling fluid that flows into turbine 204 increases as shear valve 202 is opened. Rotary steerable drilling system 200 may contain a motor (not expressly shown) which opens and closes shear valve 202. A current or voltage sent to the motor may change the amount that shear valve 202 is opened. While in FIG. 2, rotary steerable drilling system 200 includes shear valve 202, rotary steerable drilling system 200 may instead include any type of valve that may control the flow rate of fluid into turbine 204.

The flow rate of drilling fluid into turbine 204 may create a torque to rotate inner shaft 208. Changing the flow rate of the drilling fluid into turbine 204 may change the amount of torque created by turbine 204 and thus control the speed of rotation of inner shaft 208.

A set of planetary gears may couple housing 206, inner shaft 208, and thrust bearings 212. Inner shaft 208 may rotate at the same speed but in the opposite direction of housing 206 to maintain the toolface at the desired angle. The positioning of the planetary gears may contribute to maintaining a toolface between +180 and −180 degrees.

Eccentric cam 210 may be designed to bend rotary steerable drilling system 200 to point drill bit 216. Eccentric cam 210 may be any suitable mechanism that may point drill bit 216, such as a cam, a sheave, or a disc. Thrust bearings 212 may be designed to absorb the force and torque generated by drill bit 216 while drill bit 216 is drilling a wellbore (e.g., wellbore 114 shown in FIG. 1A). The planetary gears may be connected to housing 206 and inner shaft 208 to maintain drill bit 216 at a desired toolface. To point and maintain drill bit 216 at a specified toolface, the toolface may be held in a geostationary position (e.g., the toolface remains at the same angle relative to a reference in the plane perpendicular to the drill string axis) based on the rotation of inner shaft 208 in an equal and opposite direction to the rotation of housing 206 with the drill string. While the toolface may be geostationary, drill bit 216 may rotate to drill a wellbore. For example, drill bit 216 may rotate in direction 222.

During drilling operations, housing 206 may not rotate at a constant speed due to disturbances acting on housing 206 or on drill bit 216. For example, during a stick-slip situation, drill bit 216 and housing 206 may rotate in a halting fashion where drill bit 216 and housing 206 stop rotating at certain times or rotate at varying speeds. As such, the rotation speed of inner shaft 208 may need to be adjusted during the drilling operation to counteract the effect of the disturbances acting on housing 206 and maintain inner shaft 208 rotating equal and opposite of the rotation of housing 206.

Rotary steerable drilling system 200 may include a control system (not expressly shown) to adjust the rotation of inner shaft 208 during drilling operations. The control system may use a model of rotary steerable drilling system 200, as described in more detail with respect to FIGS. 3 and 4. The model may predict the behavior of rotary steerable drilling system 200 in response to disturbances and/or inputs to rotary steerable drilling system 200.

Figure 3A:
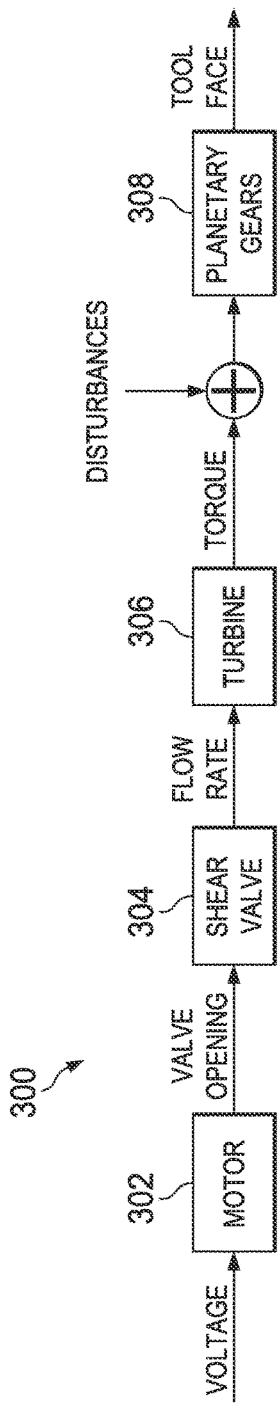
FIGS. 3A and 3B illustrate system models that describe the behavior of a rotary steerable drilling system in response to system inputs and disturbances.
Figure 3B:
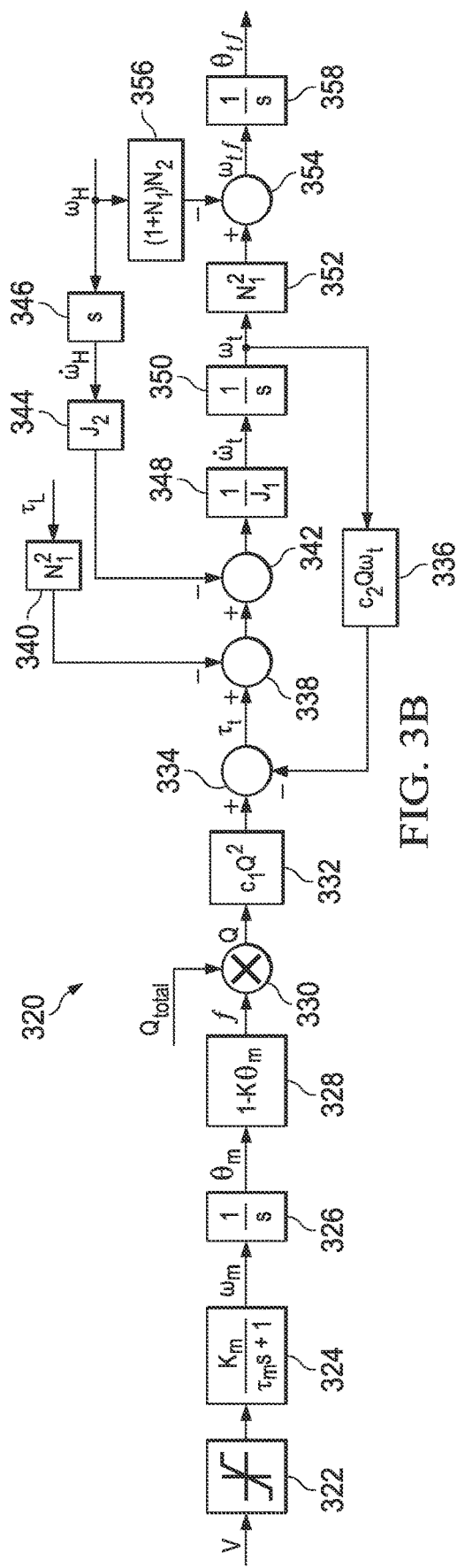

FIGS. 3A and 3B illustrate system models that describe the behavior of a rotary steerable drilling system in response to system inputs and disturbances. FIG. 3A illustrates a block diagram of simplified system model 300 showing the inputs and outputs of each component of a rotary steerable drilling system. A voltage may be transmitted to motor 302 such that motor 302 may open shear valve 304 in response to the voltage. The opening of shear valve 304 may cause drilling fluid to flow into turbine 306 at a flow rate determined by the amount shear valve 304 is opened. The flow rate of drilling fluid through turbine 306 may cause a torque to be produced such that the torque rotates an inner shaft. Additionally, any disturbances acting on the rotary steerable drilling system may be modeled and summed with the torque created by the flow of drilling fluid through turbine 306 to determine the total torque causing a rotation of the inner shaft. The inner shaft rotation may cause planetary gears 308 to rotate such that the position of planetary gears 308 controls the toolface.

FIG. 3B illustrates detailed system model 320 showing the inputs and outputs of each component of an exemplary rotary steerable drilling system. Model 320 may model the dominant properties of the rotary steerable drilling system. Dominant properties may include shear valve opening properties, flow rate and turbine rotation properties, the coupling between the turbine angular velocity and the housing angular velocity, and the effect of the coupling on the toolface. In some embodiments, model 320 may not include properties that have minimal impact on the rotary steerable drilling system, such as the frictional effects in the planetary gear system and the effect of temperature changes on the rotary steerable drilling system.

Box 322 illustrates a saturation model that may be used to limit the input into the rotary steerable drilling system. In FIG. 3B, the input is illustrated as a voltage, V. In other embodiments, such as embodiments where an alternating current (AC) motor is used, the input may be a current, a frequency of the current, or a frequency of the voltage. The saturation model represented by box 322 may provide a limit on the voltage that is input to a motor of a rotary steerable drilling system. Box 324 illustrates an example Laplace transform transfer function model of a motor of a rotary steerable drilling system where $K_m$ represents a model constant, $\tau_m$ represents the time constant of the motor, and s represents a Laplace parameter. Box 324 models the motor response to an input voltage, such as the voltage from box 322, and the output of box 324 may be an angular velocity of the motor, $\omega_m$.

Box 326 illustrates a Laplace transform transfer function used to calculate the angular displacement of the motor, $\theta_m$, based on the angular velocity of the motor. The calculated angular displacement of the motor may be an input into a model of a shear valve, as represented by box 328. The shear valve model may be used to determine the fractional valve opening, f, of the shear valve based on the angular displacement of the motor. The fractional shear valve opening may be a value between zero and one, where zero indicates that the shear valve is fully closed and one indicates that the shear valve is fully open.

The fractional shear valve opening may be used to calculate the flow rate of drilling fluid through a turbine of the rotary steerable drilling system. At multiplication operator 330, the total flow rate of drilling fluid into the system, $Q_{total}$, may be multiplied by the fractional shear valve opening to determine the flow rate through the turbine of the rotary steerable drilling system, Q. Drilling fluid that does not flow through the turbine may be directed downhole to the drill bit, such as drill bit 101 shown in FIG. 1A.

Box 332 represents a model of the turbine which may use the flow rate of drilling fluid through the turbine to calculate the torque produced by the turbine due to the fluid flow rate. In the calculation performed in block 332, Q is the flow rate through the turbine and $c_1$ is a turbine parameter. The torque produced by the turbine due to the current angular velocity of the turbine, calculated in block 336, may be subtracted from the torque produced by the turbine due to the fluid flow rate, at operator 334. In the calculation performed in block 336, $\omega_t$ is the angular velocity of the turbine and $c_2$ is a turbine parameter. The result of operator 334 may be the torque produced by the turbine, $\tau_t$.

Prior to translating the torque of the turbine into a toolface, the characteristics of the mechanical properties of the rotary steerable drilling system may be modeled. At box 340, the load torques on the system, $\tau_L$, and the gear ratio of the planetary gear system, $N_1$, may be modeled and may be subtracted from the torque produced by the turbine at operator 338. At box 344, the angular acceleration of the housing of the rotary steerable drilling system, $\omega_H$, is combined with the equivalent inertia of the housing as seen from the turbine, $J_2$, and subtracted from the results of operator 338 at operator 342. At box 348, the calculated torque from the previous steps may be incorporated into a model of the equivalent inertia of the turbine, inner shaft, and planetary gears. The model may calculate the angular acceleration of the turbine, $\omega_t$, which may be integrated by Laplace transform transfer function in box 350 to compute the angular velocity of the turbine, $\omega_t$.

At box 352, the angular velocity of the turbine may be input into a model of the planetary gear ratio where $N_1$ represents the gear ratio of the planetary gear system. The result of the modeling in box 352 may be combined at operator 354 with a model of the effect of the angular velocity of the housing and the planetary gear ratios to determine the angular velocity of the toolface, $\omega_{tf}$. The angular velocity of the toolface is the rate of change of the angle of the toolface over time. At box 358, the angular velocity of the toolface may be integrated, by Laplace transform transfer function, to determine the resulting toolface, $\theta_{tf}$.

Model 320 of the rotary steerable drilling system may be used to design a control system to maintain a precise toolface. Modifications, additions, or omissions may be made to FIG. 3B without departing from the scope of the present disclosure. For example, the equations shown in the boxes of FIG. 3B are for illustration only and may be modified based on the characteristics of the rotary steerable drilling system. Any suitable configurations of components may be used. For example, while block diagram 320 illustrates a rotary steerable drilling system including a shear valve and fluid flow to generate torque from a single stage turbine, alternatively an electric motor may be used to generate torque from the turbine. Other rotary steerable drilling system embodiments may include magnetic or electro-magnetic actuators, pneumatic actuators with single or multi-stage turbines, or hydraulic actuators with multi-stage turbines.

Figure 4A:
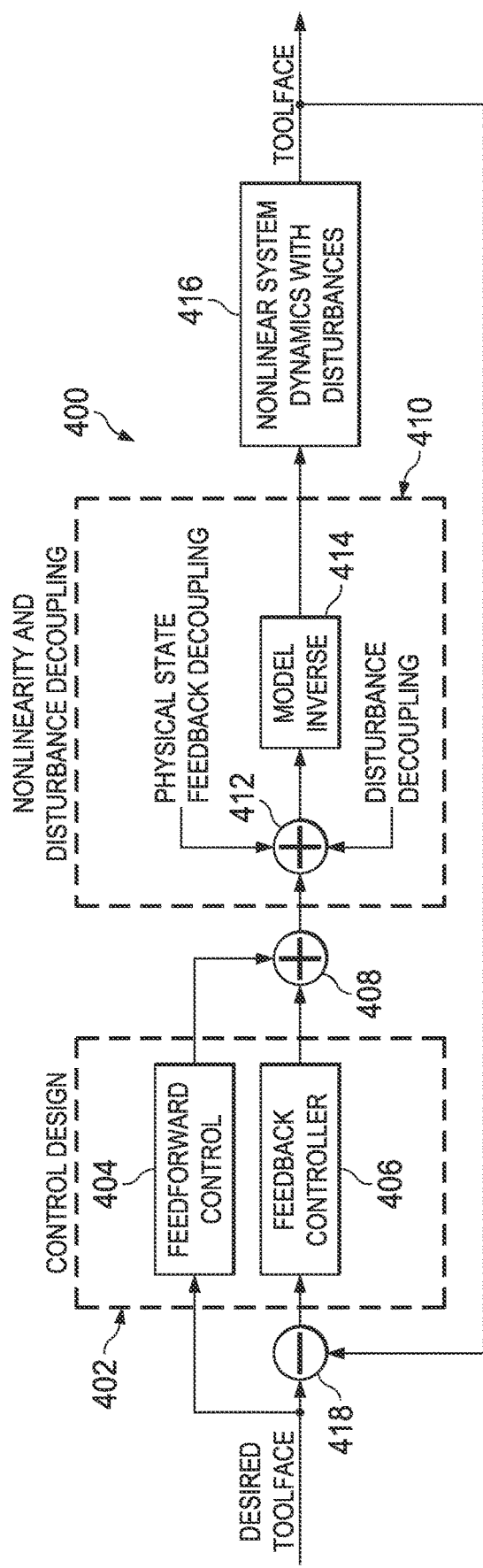
FIGS. 4A-4E illustrate block diagrams of aspects of a control system for a rotary steerable drilling system that decouple nonlinearities and disturbances.

FIGS. 4A-4E illustrate block diagrams of aspects of a control system for a rotary steerable drilling system that decouples nonlinearities and disturbances. FIG. 4A illustrates a simplified block diagram of control system 400. Control system 400 may consist of block 402, which may include feed-forward controller 404 and feedback controller 406, and block 410, including decoupling operator 412 and model inverse 414. Blocks 402 and 410 may be combined with model 416 of the rotary steerable drilling system.

The desired toolface may be input into control system 400. Feed-forward controller 404 may be used to send a command to the rotary steerable drilling system without the command passing through feedback controller 406. Feed-forward controller 404 may be used to overcome the inertia and increase the speed of the response of the rotary steerable drilling system based on a property dependent on the toolface. The difference between the desired toolface and the actual toolface (the "toolface error") may be calculated at operator 418 and input into feedback controller 406. Feedback controller 406 may generate a signal to send to a motor in a rotary steerable drilling system to cause the motor to change the fractional opening of a shear valve and change the torque of a turbine to cause the toolface to change, as described with respect to FIGS. 2 and 3. Feedback controller 406 may calculate the signal to send to the motor based on what signal will cause the motor to open the shear valve by a fractional amount that may reduce the toolface error calculated at operator 418. The signal generated by feedback controller 406 may be combined with the signal from feed-forward controller 404 at operator 408. The signal may be any suitable input signal for a rotary steerable drilling system, such as voltage, current, frequency of the voltage, or frequency of the current. The signal output from operator 408 may be adjusted in block 410 to decouple the nonlinearities of the rotary steerable drilling system and/or nonlinear responses to disturbances. The decoupling performed within block 410 may allow a linear feedback controller to control a nonlinear system operating in an environment with nonlinear disturbances by offsetting the nonlinearities. At operator 412, the signal may be summed with terms from a physical state feedback decoupling model and a disturbance decoupling model. The use of decoupling models may provide a system that may be easier to control by creating a system that can be controlled with a simple feedback controller. Model inverse 414 may invert the output of operator 412 to compute a voltage to send to model 416 of a rotary steerable drilling system, such as model 320 shown in FIG. 3B. More details of control system 400 are illustrated in FIGS. 4B-4E.

Figure 4B:
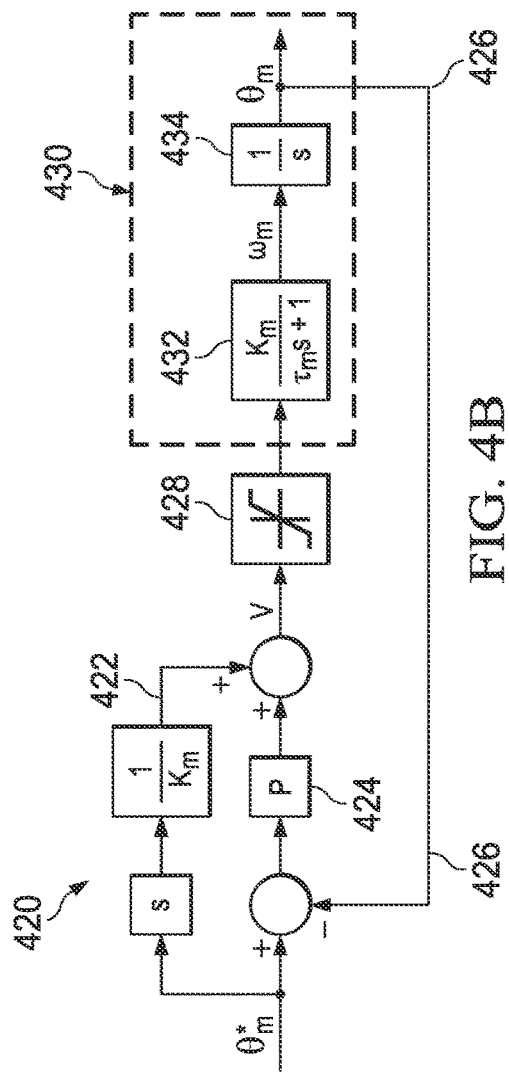

FIG. 4B illustrates a detailed block diagram of a control system showing exemplary details of a control system for a motor in a rotary steerable drilling system. The desired angular displacement of the motor, $\theta^*_m$, may be input into control system 420. Feed-forward loop 422 may use the desired angular displacement of the motor, a motor model constant, $K_m$, and a Laplace transform transfer function to compute a voltage to send to the motor to cause the motor to move a shear valve. Feed-forward loop 422 may speed up the response of the motor by determining the input voltage to send to the motor to result in the angular displacement of the motor which may cause the system to have the desired toolface.

Feedback controller 424 may be a proportional controller ("P controller") which may determine a voltage to send to the motor based on the difference between the desired angular displacement of the motor and the actual angular displacement of the motor, $\theta_m$, also known as the "motor angular displacement error." The actual angular displacement of the motor may be fed back to feedback controller 424 via feedback loop 426. The voltage outputs from feed-forward loop 422 and feedback controller 424 may be summed and input into saturation limiter 428, which may be similar to saturation limiter 322 shown in FIG. 3B. The voltage output from saturation limiter 322 may be transmitted to motor model 430, which includes model 432 of the motor and Laplace transform 434. Motor model 430 may be used to determine the angular displacement of the motor as a result of the input voltage. Other embodiments of feedback controller 424 may include, and are not limited to, a proportional-integral controller ("PI controller"), a proportional-differential controller ("PD controller"), or a proportional-integral-differential controller ("PID controller").

Figure 4C:
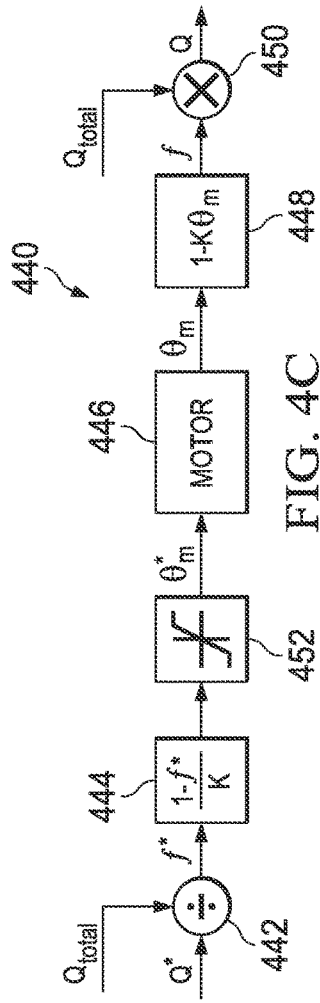

FIG. 4C illustrates a detailed block diagram of a control system showing exemplary details of a control system for a shear valve of a rotary steerable drilling system. At operator 442, the ratio of desired flow rate into the turbine, Q*, to the total flow rate into the rotary steerable drilling system, $Q_{total}$, may be computed to determine a desired fractional opening of the shear valve, f*. The desired fractional opening of the shear valve may be input into shear valve model inverse 444 to determine a desired angular displacement to send to a control system of a motor (e.g., control system 420 shown in FIG. 4B) to cause the motor to open the shear valve by the desired fractional opening amount. The output from model inverse 444 may be input into saturation limiter 452. The output of saturation limiter 452, the desired angular displacement of the motor, $\theta^*_m$, may be input into motor model 446, which may include at least a portion of the elements of control system 420 shown in FIG. 4B. Motor model 446 may output an angular displacement of the motor which may be input into shear valve model 448 which may determine the fractional shear valve opening based on the angular displacement of the motor. At operator 450, the fractional shear valve opening may be multiplied by the total flow rate into the system to obtain the flow rate into a turbine of the rotary steerable drilling system.

Figure 4D:
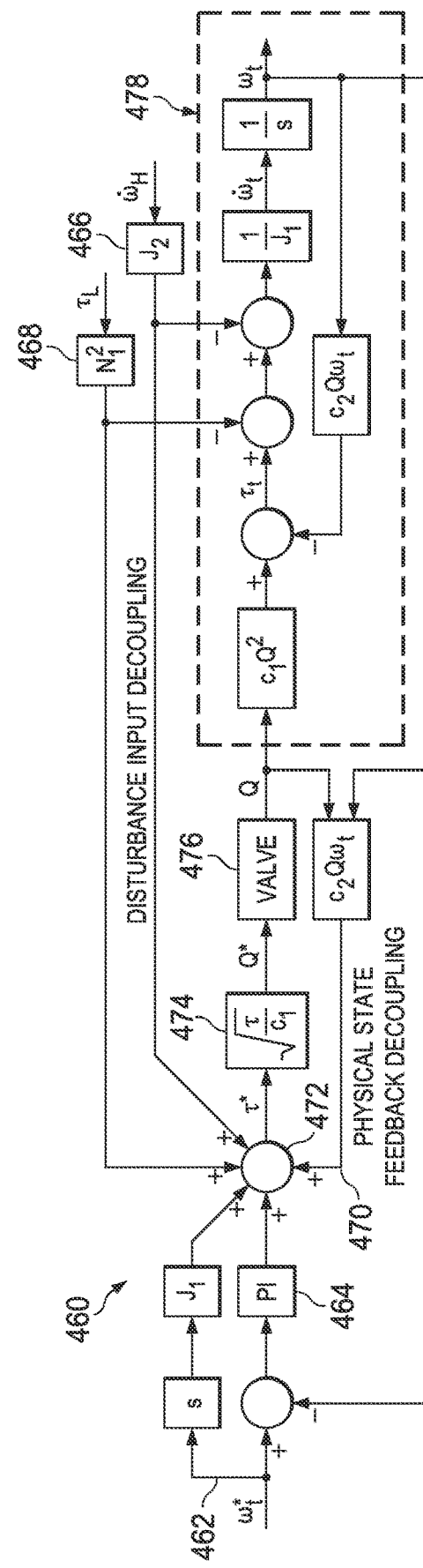

FIG. 4D illustrates a detailed block diagram of a control system that shows exemplary details of a control system for a turbine. By decoupling the effects of one or more disturbances on the system and the physical state nonlinearities, the system may be controlled through the use of feedback controller 464.

The desired angular velocity of the turbine, $\omega_t^*$, may be input into control system 460. The desired angular velocity of the turbine may be input to feed-forward loop 462 which may take the Laplace transform transfer function of the model of the equivalent inertia of the turbine, the inner shaft, and the planetary gears, $J_1$, to determine the torque of the turbine, $\tau_t$. Feedback controller 464 may determine the difference between the desired angular velocity of the turbine and the actual angular velocity of the turbine (the "turbine angular velocity error") and calculate the torque of the turbine to correct the turbine angular velocity error. Feedback controller 464 may control the response of the system to correct for errors in the models of the components of the rotary steerable drilling system or account for system behavior that may not have been included in a model of the system. For example, the system model may not model the effect of friction in the planetary gear system or the effect of wellbore temperature changes on the properties of components of the system. Other embodiments of feedback controller 464 may include, and are not limited to, a PI controller, a PD controller, or a PID controller.

Disturbances acting on the rotary steerable drilling system may be decoupled via disturbance decoupling models 466 and 468. Disturbances acting on the system may include any causes of a tool rotation anomaly, such as changes in rock formation type, fluid properties, changes in the amount of cuttings near the drill bit, lateral vibrations of the housing, drill bit walk, stick slip, bit whirl, or bit bounce. While two decoupling models are shown in FIG. 4D, there may be more or fewer decoupling models depending on the number of disturbances acting on the system and the desired accuracy of control system 460. The disturbances may be decoupled through estimating or measuring the nature of the disturbance and determining the torque of the turbine that may offset the disturbance. For example, in disturbance decoupling model 466, the angular acceleration of the housing, which may be irregular due to stick slip, may be input into a model of the equivalent inertia of the housing, as seen from the turbine, to determine the torque of the turbine that will offset the effect of the stick slip.

Physical state feedback loop 470 may include a component to decouple the response of components of the system based on inputs to the system. For example, the efficiency of a turbine in a rotary steerable drilling system may be a function of the flow rate of drilling fluid into the turbine. Physical state feedback loop 470 may model the coupling of inputs and components to offset the coupling from the behavior of the system to allow control system 460 to be controlled with a feedback controller. In some embodiments, the model included in physical state feedback loop 470 may be based on estimating the parameters used to calculate the coupling between a physical component of the system and an input into the system. In other embodiments, the model may be based on measurements provided by measuring equipment on the rotary steerable drilling system. For example, the angular velocity of the turbine and the flow rate of drilling fluid through the turbine may be measured and used in the model in physical state feedback loop 470. Physical state feedback loop 470 may additionally include a step to compare the estimated parameters used in the model with the recorded measurements. If the estimation deviates from the recorded measurements by more than a threshold amount, the model may be adjusted to more closely match the estimated parameters to the recorded measurements. The threshold amount may be based on the amount of deviation that may cause control system 460 to be inaccurate.

The output from feed-forward loop 462, disturbance decoupling models 466 and 468, physical state feedback loop 470 and feedback controller 464 may be summed at operator 472 and the resulting torque, $\tau^*$, of the turbine may be sent to model inverse 474. Model inverse 474 may calculate a desired flow rate of drilling fluid, Q*, through the rotary steerable drilling system to create the torque calculated at operator 472. The desired flow rate may be input into shear valve model 476 which may include at least a portion of the elements of control system 440 described in FIG. 4C. The output of shear valve model 476, the flow rate of drilling fluid into the turbine, may be sent to model 478, which may include components similar to blocks 332-350 shown in FIG. 3B to obtain the angular velocity of the turbine.

Figure 4E:
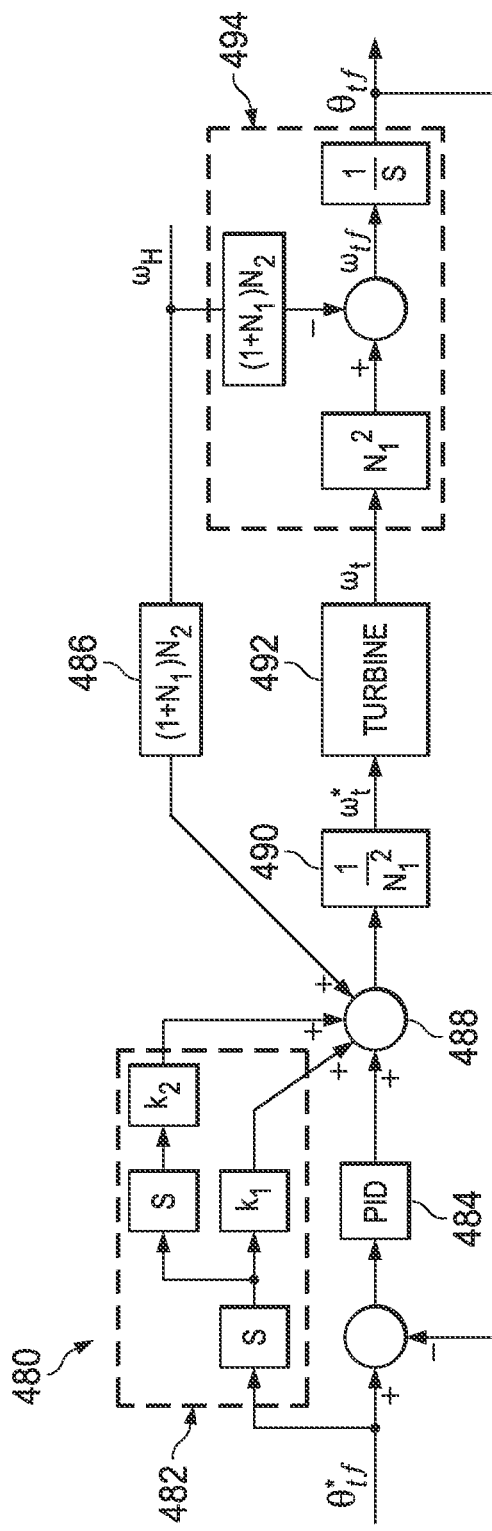

FIG. 4E illustrates a detailed block diagram of a control system that shows exemplary details of a control system for a rotary steerable drilling system. By decoupling the effects of one or more disturbances on the system and the physical state nonlinearities, the system may be controlled through the use of feedback controller 484.

The desired toolface, $\theta_{tf}^*$, may be input into control system 480. The desired toolface may be input to feed-forward loop 482 which may take the Laplace transform transfer function of the gains of the feed-forward controller, $k_1$ and $k_2$, to determine the torque of the turbine, $\tau_t$. Feedback controller 484 may determine the difference between the desired toolface and the actual toolface (the "toolface error") and calculate the torque of the turbine to correct the toolface error. Feedback controller 484 may control the response of the system to correct for errors in the models of the components of the rotary steerable drilling system or account for system behavior that may not have been included in a model of the system. For example, the system model may not model the effect of friction in the planetary gear system or the effect of wellbore temperature changes on the properties of components of the system. Feedback controller 484 may be any suitable type of controller, such as a P controller, a PI controller, a PD controller, or a PID controller.

Physical system non-linearities and disturbances acting on the rotary steerable drilling system may be decoupled via decoupling model 486. Non-linearities of the system may include physical non-linearities and/or any coupled dynamics between the housing and the turbine. Disturbances acting on the system may include any causes of a tool rotation anomaly, such as changes in rock formation type, fluid properties, changes in the amount of cuttings near the drill bit, lateral vibrations of the housing, drill bit walk, stick slip, bit whirl, or bit bounce. While one decoupling model is shown in FIG. 4E, there may be more decoupling models depending on the number of disturbances acting on the system, physical system non-linearities, and the desired accuracy of control system 480. The decoupling may be accomplished through estimating or measuring the nature of the disturbance and/or non-linearities and determining the decoupling state that may offset them. For example, in decoupling model 486, the angular velocity of the housing, which may be coupled to the rate of change of the toolface through the planetary gear system, may be input into a model of the gear ratio conversion, as seen from the turbine, to determine the housing angular acceleration that will offset its effect.

The output from feed-forward loop 482, decoupling model 486, and feedback controller 484 may be summed at operator 488 and the resulting state may be sent to planetary system gear ratio model inverse 490. Model inverse 490 may calculate a desired angular velocity of the turbine, $w_t^*$. The desired angular velocity of the turbine may be input into turbine model 492 which may include at least a portion of the elements of control system 460 described in FIG. 4D. The output of turbine model 492, the angular velocity of the turbine, may be sent to model 494, which may include components similar to blocks 352-358 shown in FIG. 3B. Control systems 420, 440, 460, and 480, shown in FIGS. 4B-4E may be combined to form a single control system for a rotary steerable drilling system or may be used individually to improve the performance of one or more components of the rotary steerable drilling system.

Figure 5A:
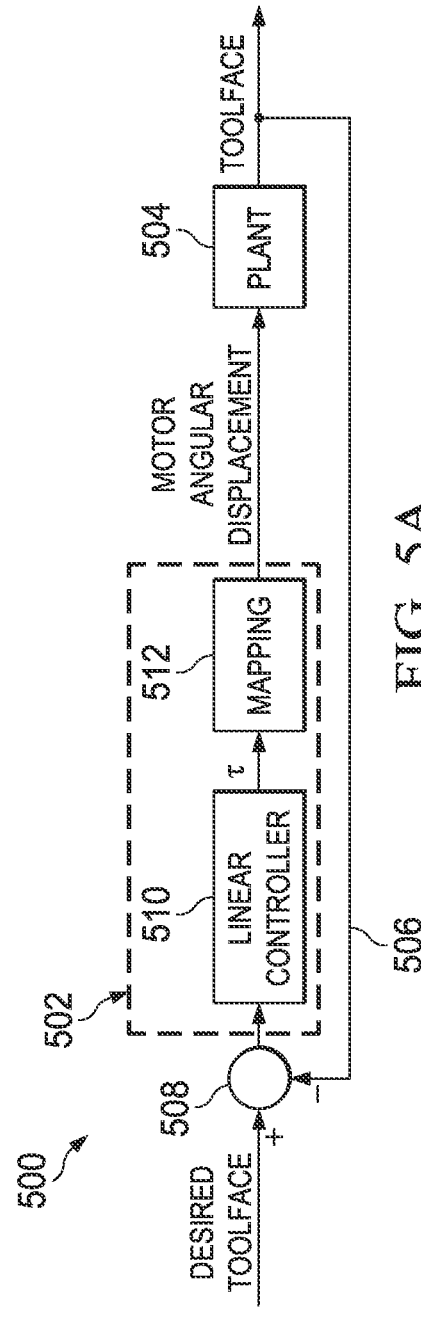

FIGS. 5A and 5B illustrate block diagrams of aspects of a nonlinear control system for a rotary steerable drilling system. Due to communications limitations and uncertainties in the downhole conditions, measurements of the dynamics of a drill bit and other components of a rotary steerable drilling system may not be available or may not be received by the control system in a timely manner. Therefore, a control system which uses few feedback paths and does not rely on downhole measurements may be desirable.

FIG. 5A illustrates a simplified block diagram of control system 500 using nonlinear controller 502 for nonlinear physical system 504. Nonlinear feedback controller 502 may compare the toolface, which may be received via feedback path 506, to the desired toolface at operator 508. Nonlinear feedback controller 502 may determine an angular displacement of the motor to send to nonlinear system 504 to adjust the toolface.

In some embodiments, the toolface may be a linear function of the torque of the turbine which may be related to the angular displacement of the motor by a one-to-one nonlinear relationship. Mapping 512 may be a simple model of a rotary steerable drilling system based on the linear relationship between two states of the rotary steerable drilling system, such as the turbine torque and the toolface. Mapping 512 may also be a simple model of a rotary steerable drilling system based on an input to the drilling system and a state of the drilling system. Linear feedback controller 510 may be designed to control the toolface by manipulating the turbine torque. Linear feedback controller 510 may be any suitable type of controller, such as a PID controller, a PI controller, a PD controller, or a P controller.

In operation, the variable for manipulating the toolface control may be the angular displacement of the motor and not the turbine torque. Therefore, the design of linear feedback controller 510 may be transformed to a controller that may output an angular displacement of the motor. In some embodiments, the torque of the turbine and the angular displacement of the motor may have a one-to-one nonlinear relationship that may be mapped in mapping 512. Using mapping 512, the manipulating variable (e.g., the torque of the turbine) may be transformed into the angular displacement of the motor by applying mapping 512 to the torque of the turbine, as output from linear feedback controller 510. The combination of linear feedback controller 510 and mapping 512 may form nonlinear controller 502 and the output of nonlinear controller 502 may be the angular displacement of the motor.

FIG. 5B illustrates a detailed block diagram of a control system 520 including nonlinear feedback controller 522. Nonlinear feedback controller 522 may use the difference between the desired toolface and the actual toolface (the toolface error), determined at operator 528, to calculate a desired angular displacement of the motor, $\theta^*_m$, to send to the motor to correct for the toolface error. Control system 520 may include PID controller 524 which may use a desired angular displacement of the motor to determine an input voltage to send to the motor. PID controller 524 may output a voltage to send to the motor. In other embodiments, PID controller 524 may output a current or a frequency to send to the motor. Physical system 530 may be similar to the model 320 shown in FIG. 3B and may receive the input voltage to the motor from PID controller 524 and output the toolface that may result from the input voltage.

For example, the toolface angle, $\theta_{tf}$, may be regulated by adjusting the shear valve position $\theta_m$. The functions of the rotary steerable drilling system may be defined by $$J_1 \omega_k = c_1 Q^2 - c_2 \omega_k Q - \tau_d$$

where Q is the flow rate of the drilling fluid, $\omega_t$ is the angular velocity of the turbine, $J_1$ is the equivalent inertia of the turbine, and $c_1$ and $c_2$ are turbine parameters. The torque of the turbine, $\tau_t$, the rate of change of the tool face angle, $\omega_{tf}$, and the valve position, $\theta_m$, may be defined by $$\tau_1 = c_1 Q^2 - c_2 \omega_t Q$$
$$\omega_u 0 = N_1^2 \omega_t = \theta^*_{tf}$$
$$\theta_m = \frac{\theta^*_m}{Q^*} Q$$

where $N_1$ is the gear ratio of the planetary gear system, $\theta_m^*$ is the fully open valve position, and $Q^*$ is the full input flow rate. By rearranging the equations, the toolface angle may be governed by $$\theta_{tf} = \frac{N_1^2}{J_1} \tau_2 - \frac{N_1^2}{J_1} \tau_d$$

Therefore, the toolface angular position is a linear function of the torque of the turbine and a linear controller (e.g., PID controller 524) may be designed to regulate the toolface by manipulating the torque of the turbine. The shear valve opening may have a one-to-one mapping with the turbine torque that may be defined by $$\theta_m = f(\tau, m_1)$$

By manipulating the torque and the angular velocity of the turbine, the manipulation variable, $\theta_m$, may be calculated to regulate the toolface.

FIG. 6 illustrates a block diagram of a control system including a backstepping based controller to control a toolface. Backstepping based control system 600 may be used to control a toolface that is a part of a rotary steerable drilling system that follows a strict feedback form where the derivative of the states of the model depend only on the state-of-interest itself, the states prior to the state-of-interest, and one state strictly following the state-of-interest. For example, the toolface may be based on the turbine angular velocity, which may be based on the flow rate through the turbine, which may be based on the fractional opening of the shear valve, which may be based on the voltage input to the motor. The function of a state of the model used to create backstepping based control system 600 may be based on the state and tracking error values of the states prior to the state of interest.

Control system 600 may receive a desired toolface, $\theta_r$, and compare the desired toolface, to the actual toolface, $\theta_t$, to determine the toolface error, $e_1$, at operator 602. The toolface error may be sent to block 604 where the angular velocity of the turbine that may result in the desired toolface may be calculated. The angular velocity of the turbine may be calculated based on a function, $C_1$, of the toolface error, the measured toolface, and the angular velocity of the housing. $C_1$ may be calculated by $$e_1 = x_1 - r$$

$$\dot{e}_1 = N_1 x_2 - \dot{r} + N_2 \omega_g$$

assuming $x_1^{ref} = r$ resulting in:

$$C_1 = \frac{1}{2} e_1^2$$

based on the value for $C_1$, and the constraint that the derivative of $C_1$ is less than zero, a desired turbine speed, $x_2^{des}$, may be calculated by $$x_2^{des} = -\frac{k_1 e_1}{N_1} + \frac{\dot{r}}{N_1} - \frac{N_2 \omega_H}{N_1}$$

where r is a control reference and $k_1$ is the control gain and may be a small number due to a small amount of uncertainty for the state represented in block 604.

At operator 606, the actual angular velocity of the turbine may be compared to the calculated desired angular velocity of the turbine to determine the turbine angular velocity error, $e_2$. The turbine angular velocity error may be sent to block 608 where the desired opening angle of the shear valve may be calculated based on the function, $C_2$, based on the estimated load of the housing, the angular velocity of the turbine, the toolface error and the turbine angular velocity error. The desired opening angle of the shear valve may be the angle that results in the desired angular velocity of the turbine. $C_2$ may be calculated by $$e_2 = x_2 - \left( \frac{-k e_1}{N_1} + \frac{\dot{r}}{N_1} - \frac{N_2 \omega_H}{N_1} \right)$$

$$\dot{e}_2 = \dot{x}_2 + \frac{K_1 \dot{e}_1}{N_1} - \frac{\ddot{r}}{N_1} + \frac{N_2}{N_1} \dot{\omega}_H$$

therefore $$\dot{e}_2 = \frac{C_1}{J_T} Q^2 - \frac{C_2 x_2}{J_T} Q + \frac{\Delta}{J_T} - N_1 \tau_L - J_{housing} \ddot{\theta}_{housing} + \frac{k_1 \dot{e}_1}{N_1} - \frac{\ddot{r}}{N_1} + \frac{N_2 \omega_H}{N_1}$$

where $\Delta$ is the uncertainty of the system dynamics model, may result in $$C_2 = \frac{1}{2} e_1^2 + \frac{1}{2} e_2^2$$

$$\frac{C_1}{J_T} Q^2 - \frac{C_2 x_2}{J_T} Q + \frac{\Delta}{J_T} - \underbrace{N_1 \tau_L - J_{housing} \ddot{\theta}_{housing} + \frac{k_1 \dot{e}_1}{N_1} - \frac{\ddot{r}}{N_1} + \frac{N_2 \omega_H}{N_1}}_{D} = -k_2 e_2$$

based on the value for $C_2$, and the constraint that the derivative of $C_2$ is less than zero, a desired flow rate, $Q_{des}$, and desired shear valve opening, $\varphi_{des}$, may be calculated by $$Q_{des} = \frac{\frac{C_2 x_2^{des}}{J_T} + \sqrt{\frac{C_2^2 x_2^{des\,2}}{J_T^2} - 4 \frac{C_1}{J_T} \left[ \frac{k_1 \dot{e}_1}{N_1} - \frac{\ddot{r}}{N_1} + k_2 e_2 + \frac{N_2 \omega_H}{N_1} - D + N_1 e_1 \right]}}{2 \frac{C_1}{J_T}}$$

$$\varphi_{Des} = \frac{85 Q_{Des}}{Q^*} = \frac{85 M}{Q^*}$$

At operator 610, the actual opening angle of the shear valve may be compared to the desired opening angle of the shear valve to calculate the shear valve opening angle error, $e_3$. The shear valve opening angle error may be used, in block 612, to determine the control input (e.g., voltage) to send to the motor of rotary steerable drilling system 614 to cause the shear valve to open by the desired amount. $C_3$ may be calculated by $$e_3 = \varphi - \varphi_{Des} = \varphi - \frac{85 M}{Q^*}$$

$$\dot{e}_3 = \dot{\varphi} - \frac{85 \dot{M}}{Q^*}$$

based on the equations derived above $$\dot{e}_3 = -\frac{1}{\tau_m} \varphi + k_m u - \frac{85 \dot{M}}{Q^*} = -\frac{1}{\tau_m} e_3 - \frac{85 M}{Q^* \tau_m} + k_m u - \frac{85 \dot{M}}{Q^*}$$

resulting in $$C_3 = \frac{1}{2}e_1^2 + \frac{1}{2}e_2^2 + \frac{1}{2}e_3^2$$

based on the value for $C_3$, and the constraint that the derivative of $C_3$ is less than zero, the control input, u, may be calculated by $$u = \frac{\frac{85M}{\tau_M Q^*} + \frac{85\dot{M}}{Q^*} - k_3 e_3}{k_m}$$

The dynamics of the rotary steerable drilling system 614 may be defined by $$\begin{cases} \dot{x}_1 = N_1 x_2 + N_2 \omega_u \\ J_T \dot{x}_2 = C_1 Q^2 - C_2 x_2 Q - \underbrace{n_1 \tau_L - J_{housing} \ddot{\theta}_{housing}}_{disturbance} + \Delta \\ \dot{\varphi} = -\frac{1}{\tau_m}\varphi + k_m u \end{cases}$$

where: $Q = \frac{1}{85}\varphi Q^*$ where $x_1$ is the toolface, $x_2$ is the angular velocity of the turbine, $N_1$ and $N_2$ are gear ratios of the planetary gear system, $CO_H$ is the angular velocity of the housing, $J_T$ is the inertia of the turbine, Q is the flow rate of drilling fluid through the turbine, $\tau_L$ is the load torque on the system, $J_{housing}$ is the inertia of the housing, $\ddot{\theta}_{housing}$ is the angular acceleration of the housing, $\varphi$ is the shear valve opening angle, $\tau_m$ is the torque of the motor, $k_m$ is a model constant, u is the control input, $\Delta$ is the uncertainty associated with the model equation when comparing the model with the actual physical system, and 85 is a coefficient of the shear valve. The coefficient of the shear valve may be any number based on the characteristics of the shear valve.

The control input may be calculated based on a function, $C_3$, of the shear valve opening angle error, the measured opening angle of the shear valve, the desired opening angle of the shear valve, and the turbine angular velocity error. The control input to rotary steerable drilling system 614 may adjust the toolface to match the desired toolface.

Control system 600 may require real-time knowledge of the angular velocity of the housing, load on the housing, measured toolface, measured angular velocity of the turbine, measured opening angle of the shear valve, and any other parameter that may be needed to perform the calculations to back step through system 614. The real-time knowledge may be obtained from measurements provided by sensors on rotary steerable drilling system 614 or through the use of estimates obtained from a model of rotary steerable drilling system 614.

The functions $C_1$, $C_2$, and $C_3$ may be a set of Lyapunov functions. The control system may calculate the result of the functions such that the derivative of each function is less than zero. The constraint may be used to consider transient control system performance and provide robustness against any uncertainties, such as modeling uncertainties and/or estimation uncertainties.

Figure 7A:
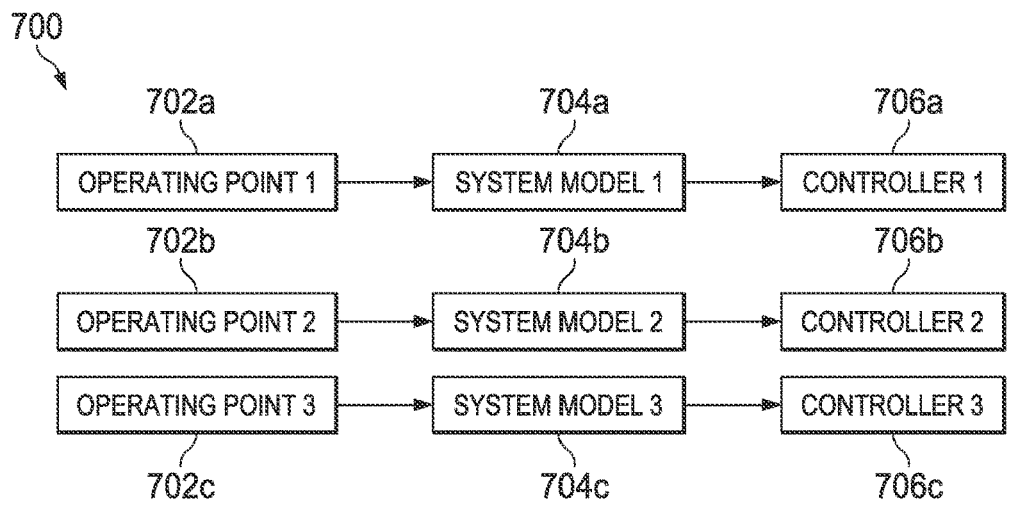
FIGS. 7A and 7B illustrate block diagrams of an exemplary control system using a set of linear systems to model the nonlinear dynamics of a rotary steerable drilling system.
Figure 7B:
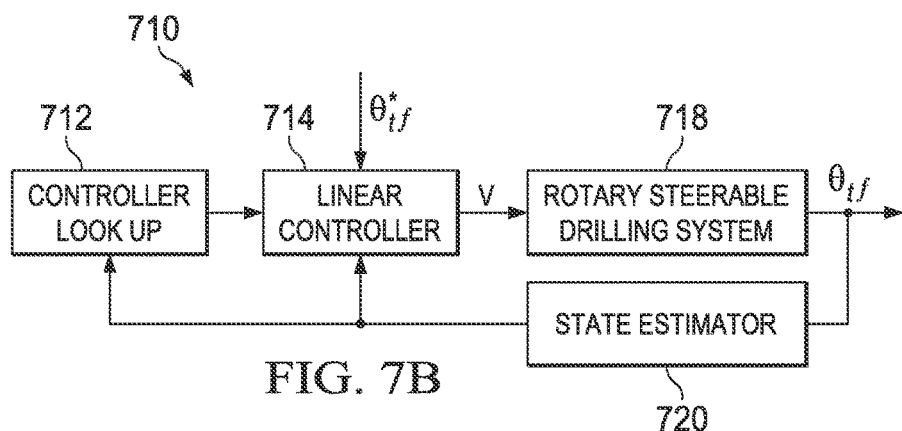

FIGS. 7A and 7B illustrate block diagrams of an exemplary control system using a set of linear systems to approximate the nonlinear dynamics of a rotary steerable drilling system. In FIG. 7A, dataset 700 may include multiple sets of operating points 702a-702c ("operating points 702"). Operating point sets 702 may include one or more of any suitable state of a rotary steerable drilling system, such as system 200 shown in FIG. 2, such as toolface, the angular displacement of the motor, the angular velocity of the turbine, turbine torque, voltage, or flow rate. For each set of operating points 702 in dataset 700, system models 704a-704c ("system models 704") may be generated by linearizing the nonlinear steerable drilling system model about the corresponding operating points 702. Controllers 706a-706c ("controllers 706") may be designed based on system models 704 and may be linear controllers that control the toolface of system models 704. Controllers 706 may be a family of linear controllers 706 designed to control the toolface within a specific region of the corresponding set of operating points 702.

In FIG. 7B, control system 710 illustrates the use of dataset 700 to control a rotary steerable drilling system. Control system 710 may include controller look-up block 712 where control system 710 may look up, in dataset 700, a system model 704 and controller 706, using a current operating point of the rotary steerable drilling system. Controller look-up block 712 may match the current operating point with an operating point 702 in dataset 700. The current operating point of the system may be determined by measurements provided by one or more sensors on the rotary steerable drilling system or may be estimated by state estimator 720. Based on the matched operating point 702, control system 710 may select a system model 704 and controller 706 and use the selected system model 704 and controller 706 as linear system model 718 and linear controller 714, respectively, in control system 710.

Once a system model 704 and controller 706 have been selected, linear controller 714, which may correspond to the selected controller 706, may receive a desired toolface, $\theta_{tf}^*$. The desired toolface may be compared to the actual toolface to compute the toolface error. Controller 714 may generate a voltage command to send to rotary steerable drilling system 718 to correct the toolface error. System 718 may generate the toolface resulting from the input voltage.

For example, the toolface may be calculated by $$\theta_{tf}(s) = G_0(s) + G_1(s)V(s) + G_2(s)\tau_L(s) + G_3(s)\theta_H(s)$$

where $$G_0(s) = \frac{N_1^2 m_0}{s(s - m_2)}$$

$$G_1(s) = \frac{K_m N_1^2 m_1}{s^2(s - m_2)(\tau_m s + 1)}$$

$$G_2(s) = -\frac{\frac{N_1^4}{J1}}{s(s - m_2)}$$

$$G_3(s) = -\frac{\left[\frac{J_2}{J_1}N_1^2 + (1 - N_1)N_2\right]s - (1 - N_1)N_2 m_2}{s - m_2}$$

The variables $m_0$, $m_1$, and $m_2$ may be constants calculated based on the operating point (e.g., one of operating point 702a-702c). If $Q_0$, $\theta_{m0}$, and $\theta_{t0}$ are the values of Q, $\theta_m$, and $\theta_t$ at a selected operating point, the values for $m_0$, $m_1$, and $m_2$ may be calculated by $$m_0 = \frac{C_1 Q_0^2}{J_1}(1-k^2\theta_{m0}^2) - \frac{C_2 Q_0}{J_1}k\theta_{m0}\theta_{t0}$$

$$m_1 = \frac{C_1 Q_0^2}{J_1}2k(k\theta_{m0}-1) + \frac{C_2 Q_0}{J_1}k\theta_{t0}$$

$$m_2 = -\frac{C_1 Q_0}{J_1}(1-k\theta_{m0})$$

Figure 8:
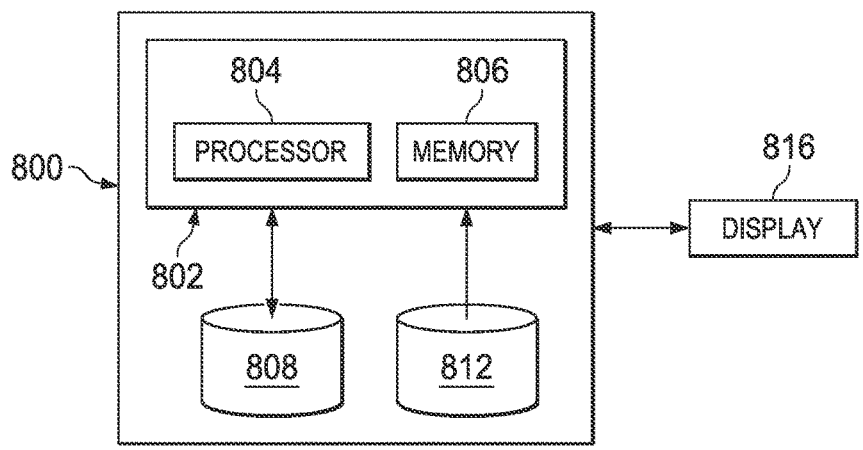
FIG. 8 illustrates a block diagram of an exemplary toolface control system for a logging tool.

FIG. 8 illustrates a block diagram of an exemplary toolface control system for a rotary steerable drilling tool. Toolface control system 800 may be configured to perform toolface control for any suitable rotary steerable drilling tool, such as rotary steerable drilling tool 200. Toolface control system 800 may be used to perform the steps of any control system described in the present disclosure, such as control system 460, control system 520, control system 600, and/or control system 700 as described with respect to FIGS. 4-7, respectively. Toolface control system 800 may be located on the surface of the wellbore or may be located downhole as part of a downhole tool or part of the rotary steerable drilling system.

In some embodiments, toolface control system 800 may include toolface control module 802. Toolface control module 802 may include any suitable components. For example, in some embodiments, toolface control module 802 may include processor 804. Processor 804 may include, for example a microprocessor, microcontroller, digital signal processor (DSP), application specific integrated circuit (ASIC), or any other digital or analog circuitry configured to interpret and/or execute program instructions and/or process data. In some embodiments, processor 804 may be communicatively coupled to memory 806. Processor 804 may be configured to interpret and/or execute program instructions and/or data stored in memory 806. Program instructions or data may constitute portions of software for carrying out the design of a control system to control a toolface on a rotary steerable drilling tool, as described herein. Memory 806 may include any system, device, or apparatus configured to hold and/or house one or more memory modules; for example, memory 806 may include read-only memory, random access memory, solid state memory, or disk-based memory. Each memory module may include any system, device or apparatus configured to retain program instructions and/or data for a period of time (e.g., computer-readable non-transitory media).

Toolface control system 800 may further include rotary steerable drilling system model 808. Rotary steerable drilling system model 808 may be communicatively coupled to toolface control module 802 and may provide values that may be used to model the response of a rotary steerable drilling system to an input signal (e.g., voltage) in response to a query or call by toolface control module 802. Rotary steerable drilling system model 808 may be implemented in any suitable manner, such as by functions, instructions, logic, or code, and may be stored in, for example, a relational database, file, application programming interface, library, shared library, record, data structure, service, software-as-service, or any other suitable mechanism. Rotary steerable drilling system model 808 may include code for controlling its operation such as functions, instructions, or logic. Rotary steerable drilling system model 808 may specify any suitable models that may be used to model the dynamics of a rotary steerable drilling system, such as a model of a motor, a model of a shear valve, a model of a turbine, and a model of a planetary gear system.

Toolface control system 800 may further include disturbance estimation database 812. Disturbance estimation database 812 may be communicatively coupled to toolface control module 802 and may provide estimations of disturbances that may act on a rotary steerable drilling system in response to a query or call by toolface control module 802. Disturbance estimation database 812 may be implemented in any suitable manner, such as by functions, instructions, logic, or code, and may be stored in, for example, a relational database, file, application programming interface, library, shared library, record, data structure, service, software-as-service, or any other suitable mechanism. Disturbance estimation database 812 may include code for controlling its operation such as functions, instructions, or logic. Disturbance estimation database 812 may specify any suitable properties of the conditions in a wellbore that may be used for estimating the disturbances that may act on a rotary steerable drilling system, such as the type of rock drilled by the drill bit, the drilling fluid properties, the amount of cuttings in the wellbore, the lateral vibrations, the bit walk, bit bounce, bit whirl, the housing speed, and/or stick slip. Although toolface control system 800 is illustrated as including two databases, toolface control system 800 may contain any suitable number of databases.

In some embodiments, toolface control module 802 may be configured to generate control signals for toolface control of a rotary steerable drilling system. For example, toolface control module 802 may be configured to import one or more instances of rotary steerable drilling system model 808, and/or one or more instances of disturbance estimation database 812. Values from rotary steerable drilling system model 808, and/or disturbance estimation database 812 may be stored in memory 806. Toolface control module 802 may be further configured to cause processor 804 to execute program instructions operable to generate control signals for toolface control for a rotary steerable drilling system. For example, processor 804 may, based on values in rotary steerable drilling system model 808 and disturbance estimation database 812, monitor the toolface of a rotary steerable drilling system as a measured toolface and may determine an updated input signal to send to the rotary steerable drilling system to correct the toolface, as discussed in further detail with reference to FIGS. 1-7.

Toolface control module 802 may be communicatively coupled to one or more displays 816 such that information processed by toolface control module 802 (e.g., input signals for the logging tool) may be conveyed to operators of drilling and logging equipment at the wellsite or may be displayed at a location offsite.

Modifications, additions, or omissions may be made to FIG. 8 without departing from the scope of the present disclosure. For example, FIG. 8 shows a particular configuration of components for toolface control system 800. However, any suitable configurations of components may be used. For example, components of toolface control system 800 may be implemented either as physical or logical components. Furthermore, in some embodiments, functionality associated with components of toolface control system 800 may be implemented in special purpose circuits or components. In other embodiments, functionality associated with components of toolface control system 800 may be implemented in a general purpose circuit or components of a general purpose circuit. For example, components of toolface control system 800 may be implemented by computer program instructions.

Embodiments disclosed herein include:

A. A method of forming a wellbore including determining a desired toolface of a drilling tool, calculating a toolface error by determining a difference between a current toolface of the drilling tool during a drilling operation and the desired toolface, calculating a correction to correct the toolface error, the correction includes solving for a signal to send to an input component by: estimating, using a model of a series of components of the drilling tool, an output of each of a plurality of states of the model based on an input to each of the states of the model and determining a desired input to each of the plurality of states, beginning at the toolface, based on a desired output of at least one of the plurality of states connected to a particular state, the desired output of the at least one of the plurality of states connected to the particular state is calculated by using the model, transmitting the signal to the input component of the drilling tool such that the signal adjusts the current toolface based on the correction, and drilling a wellbore with a drill bit oriented at the desired toolface.

B. A non-transitory machine-readable medium comprising instructions stored therein, the instructions executable by one or more processors to facilitate performing a method of forming a wellbore, the method including determining a desired toolface of a drilling tool, calculating a toolface error by determining a difference between a current toolface of the drilling tool during a drilling operation and the desired toolface, calculating a correction to correct the toolface error, the correction includes solving for a signal to send to an input component by: estimating, using a model of a series of components of the drilling tool, an output of each of a plurality of states of the model based on an input to each of the states of the model and determining a desired input to each of the plurality of states, beginning at the toolface, based on a desired output of at least one of the plurality of states connected to a particular state, the desired output of the at least one of the plurality of states connected to the particular state is calculated by using the model, transmitting the signal to the input component of the drilling tool such that the signal adjusts the current toolface based on the correction, and drilling a wellbore with a drill bit oriented at the desired toolface.

C. A downhole drilling tool control system including a processor, a memory communicatively coupled to the processor with computer program instructions stored therein, the instructions configured to, when executed by the processor, cause the processor to determine a desired toolface of a drilling tool and calculate a toolface error by determining a difference between a current toolface of the drilling tool during a drilling operation and the desired toolface. The instructions further cause the processor to calculate a correction to correct the toolface error, the correction includes solving for an input to the input component by estimating, using a model of a series of components of the drilling tool, an output of each of a plurality of states of the model based on an input to each of the states of the model and determining a desired input to each of the plurality of states, beginning at the toolface, based on a desired output of at least one of the plurality of states connected to a particular state, the desired output of the at least one of the plurality of states connected to the particular state is calculated by using the model;

The instructions further cause the processor to transmit a signal to the input component of the drilling tool such that the signal adjusts the current toolface based on the correction and drill a wellbore with a drill bit oriented at the desired toolface.

D. A drilling system including a drilling tool, a drill string connected to the drilling tool, a drill bit coupled to a toolface of the drilling tool, and a control system operable to control the of a toolface of the drilling tool. The control system controls the of the toolface by determining a desired toolface of a drilling tool, calculating a toolface error by determining a difference between a current toolface of the drilling tool during a drilling operation and the desired toolface, calculating a correction to correct the toolface error, the correction includes solving for a signal to send to an input component by: estimating, using a model of a series of components of the drilling tool, an output of each of a plurality of states of the model based on an input to each of the states of the model and using the model, starting from the toolface, determining a desired input to each of the plurality of states, in order, based on a desired output of the states connected to a particular state, transmitting the signal to the input component of the drilling tool such that the signal adjusts the current toolface based on the correction, and drilling a wellbore with a drill bit oriented at the desired toolface.

Each of embodiments A, B, C, and D may have one or more of the following additional elements in any combination: Element 1: wherein the model is created such that the model follows a strict feedback form. Element 2: wherein computing the signal to correct the toolface error further includes creating a set of functions defining the desired input to each of the plurality of states and constraining the solution to the set of functions such that the derivative of each of the set of functions is less than zero. Element 3: wherein computing the signal to correct the toolface error further includes using information about the behavior of a housing of the drilling tool. Element 4: wherein the information about the behavior of the housing of the drilling tool includes at least one of an angular velocity of the housing, a load on the housing, or an angular acceleration of the housing. Element 5: wherein the information about the behavior of a housing of the drilling tool is received from measurements on the drilling tool. Element 6: wherein the signal is a voltage.

Although the present disclosure has been described with several embodiments, various changes and modifications may be suggested to one skilled in the art. For example, although the present disclosure describes a rotary steerable drilling system using a motor and a shear valve to cause the turbine to produce torque, the same principles may be used to model and control the toolface of any suitable rotary steerable drilling tool according to the present disclosure. It is intended that the present disclosure encompasses such changes and modifications as fall within the scope of the appended claims.

What is claimed is:

1. A method of forming a wellbore comprising:
   determining a desired toolface of a drilling tool;
   calculating a toolface error by determining a difference between a current toolface of the drilling tool during a drilling operation and the desired toolface;
   calculating a correction to correct the toolface error, the correction including solving for a signal to send to an input component by:

estimating, using a model of a series of components of the drilling tool, an output of each of a plurality of states of the model based on an input to each of the states of the model; and determining a desired input to each of the plurality of states, beginning at the toolface, based on a desired output of at least one of the plurality of states connected to a particular state, the desired output of the at least one of the plurality of states connected to the particular state being calculated by using the model;

transmitting the signal to the input component of the drilling tool, the signal being based on the correction;

adjusting the current toolface based on the signal to match the desired toolface; and drilling a wellbore with the drilling tool oriented at the desired toolface.

2. The method according to claim 1, wherein the model is created such that the model follows a strict feedback form.

3. The method according to claim 1, wherein solving for the signal to correct the toolface error further includes:

creating a set of functions defining the desired input to each of the plurality of states; and constraining a solution to the set of functions such that the derivative of each of the set of functions is less than zero.

4. The method according to claim 1, wherein solving for the signal to correct the toolface error further includes using information about a behavior of a housing of the drilling tool.

5. The method according to claim 4, wherein the information about the behavior of the housing of the drilling tool includes at least one of an angular velocity of the housing, a load on the housing, or an angular acceleration of the housing.

6. The method according to claim 4, wherein the information about the behavior of a housing of the drilling tool is received from measurements on the drilling tool.

7. The method according to claim 1, wherein the signal is a voltage.

8. A non-transitory machine-readable medium comprising instructions stored therein, the instructions executable by one or more processors to facilitate performing a method of forming a wellbore, the method comprising:

determining a desired toolface of a drilling tool;

calculating a toolface error by determining a difference between a current toolface of the drilling tool during a drilling operation and the desired toolface;

calculating a correction to correct the toolface error, the correction including solving for a signal to send to an input component by:

estimating, using a model of a series of components of the drilling tool, an output of each of a plurality of states of the model based on an input to each of the states of the model; and determining a desired input to each of the plurality of states, beginning at the toolface, based on a desired output of at least one of the plurality of states connected to a particular state, the desired output of the at least one of the plurality of states connected to the particular state being calculated by using the model;

transmitting the signal to the input component of the drilling tool, the signal being based on the correction;

adjusting the current toolface based on the signal to match the desired toolface; and drilling a wellbore with a drill bit oriented at the desired toolface.

9. The non-transitory machine-readable medium according to claim 8, wherein the model is created such that the model follows a strict feedback form.

10. The non-transitory machine-readable medium according to claim 8, wherein computing the signal to correct the toolface error further includes:

creating a set of functions defining the desired input to each of the plurality of states; and constraining a solution to the set of functions such that the derivative of each of the set of functions is less than zero.

11. The non-transitory machine-readable medium according to claim 8, wherein solving for the signal to correct the toolface error further includes using information about a behavior of a housing of the drilling tool.

12. The non-transitory machine-readable medium according to claim 11, wherein the information about the behavior of the housing of the drilling tool includes at least one of an angular velocity of the housing, a load on the housing, or an angular acceleration of the housing.

13. The non-transitory machine-readable medium according to claim 11, wherein the information about the behavior of a housing of the drilling tool is received from measurements on the drilling tool.

14. The non-transitory machine-readable medium according to claim 8, wherein the signal is a voltage.

15. A downhole drilling tool control system comprising:

a processor;

a memory communicatively coupled to the processor with computer program instructions stored therein, the instructions configured to, when executed by the processor, cause the processor to:

determine a desired toolface of a drilling tool;

calculate a toolface error by determining a difference between a current toolface of the drilling tool during a drilling operation and the desired toolface;

calculate a correction to correct the toolface error, the correction including solving for a signal to send to an input component by:

estimating, using a model of a series of components of the drilling tool, an output of each of a plurality of states of the model based on an input to each of the states of the model; and determining a desired input to each of the plurality of states, beginning at the toolface, based on a desired output of at least one of the plurality of states connected to a particular state, the desired output of the at least one of the plurality of states connected to the particular state being calculated by using the model;

transmit the signal to the input component of the drilling tool, the signal being based on the correction;

adjust the current toolface based on the signal to match the desired toolface; and drill a wellbore with a drill bit oriented at the desired toolface.

16. The downhole drilling tool control system according to claim 15, wherein the model is created such that the model follows a strict feedback form.

17. The downhole drilling tool control system according to claim 15, wherein solving for the signal to correct the toolface error further includes:

creating a set of functions defining the desired input to each of the plurality of states; and constraining a solution to the set of functions such that the derivative of each of the set of functions is less than zero.

18. The downhole drilling tool control system according to claim 15, wherein solving for the signal to correct the toolface error further includes using information about a behavior of a housing of the drilling tool.

19. The downhole drilling tool control system according to claim 18, wherein the information about the behavior of the housing of the drilling tool includes at least one of an angular velocity of the housing, a load on the housing, or an angular acceleration of the housing.

20. The downhole drilling tool control system according to claim 18, wherein the information about the behavior of a housing of the drilling tool is received from measurements on the drilling tool.

\* \* \* \* \*